(12) United States Patent
Kim

(10) Patent No.: US 11,170,097 B1
(45) Date of Patent: Nov. 9, 2021

(54) SECURE AUTHENTICATION SERVER FOR SMART CONTRACT

(71) Applicant: Jong Hyeon Kim, Seoul (KR)

(72) Inventor: Jong Hyeon Kim, Seoul (KR)

( * ) Notice: Subject to any disclaimer, the term of this patent is extended or adjusted under 35 U.S.C. 154(b) by 402 days.

(21) Appl. No.: 16/468,279

(22) PCT Filed: May 20, 2019

(86) PCT No.: PCT/KR2019/006017
§ 371 (c)(1),
(2) Date: Jun. 10, 2019

(87) PCT Pub. No.: WO2020/050474
PCT Pub. Date: Mar. 12, 2020

(30) Foreign Application Priority Data

Sep. 4, 2018 (KR) ........................ 10-2018-0105594

(51) Int. Cl.
*H04L 29/06* (2006.01)
*G06F 21/54* (2013.01)
(Continued)

(52) U.S. Cl.
CPC .............. *G06F 21/54* (2013.01); *G06F 21/33* (2013.01); *G06F 21/577* (2013.01)

(58) Field of Classification Search
None
See application file for complete search history.

(56) References Cited

U.S. PATENT DOCUMENTS

| | | | |
|---|---|---|---|
| 10,656,936 B2* | 5/2020 | Robison | G06F 8/36 |
| 2019/0149550 A1* | 5/2019 | Brakeville | G06F 21/62 726/5 |

(Continued)

FOREIGN PATENT DOCUMENTS

| | | |
|---|---|---|
| KR | 101637854 B1 | 7/2016 |
| KR | 20180041055 A | 4/2018 |

OTHER PUBLICATIONS

Hegedus, Peter. Towards Analyzing the Complexity Landscape of Solidity Based Ethereum Smart Contracts. 2018 IEEE/ACM 1st International Workshop on Emerging Trends in Software Engineering for Blockchain (WETSEB). https://ieeexplore.ieee.org/stamp/stamp.jsp?tp=&arnumber=8445056 (Year: 2018).*

(Continued)

*Primary Examiner* — Jeremiah L Avery
(74) *Attorney, Agent, or Firm* — Renaissance IP Law Group LLP

(57) ABSTRACT

A server which performs secure authentication on a source code for smart contract may comprise a communication unit receiving a smart contract source code from the server requesting secure authentication; and a controller checking security vulnerability based on the received smart contract source code, wherein the controller comprises a source code vulnerability checking unit reading a source code of a smart contract and checking vulnerability in the source code; a communication interval checking unit checking a communication interval for execution of the source code; an execution vulnerability checking unit checking app and web vulnerability on a browser in which the source code is executed; a certificate issuing unit issuing a certificate if it is found from a checking result that a security level satisfies a required criterion and storing the certificate together with the source code in a blockchain block where the source code of the smart contract is stored.

8 Claims, 5 Drawing Sheets

(51) Int. Cl.
*G06F 21/57* (2013.01)
*G06F 21/33* (2013.01)

(56) References Cited

U.S. PATENT DOCUMENTS

| | | | | |
|---|---|---|---|---|
| 2019/0303541 | A1* | 10/2019 | Reddy | H04L 9/0643 |
| 2019/0303623 | A1* | 10/2019 | Reddy | G06F 11/3692 |
| 2019/0306173 | A1* | 10/2019 | Reddy | H04L 63/126 |
| 2019/0334904 | A1* | 10/2019 | Lelcuk | G06Q 20/0457 |
| 2020/0005559 | A1* | 1/2020 | Grunbok, II | G08G 1/202 |

OTHER PUBLICATIONS

Kang, Eung Seon et al. A Blockchain-Based Energy Trading Platform for Smart Homes in a Microgrid. 2018 3rd International Conference on Computer and Communication Systems (ICCCS). https://ieeexplore.ieee.org/stamp/stamp.jsp?tp=&arnumber=8463317 (Year: 2018).*

Wright, Craig; Serguieva, Antoaneta. Sustainable blockchain-enabled services: Smart contracts. 2017 IEEE International Conference on Big Data (Big Data). https://ieeexplore.ieee.org/stamp/stamp.jsp?tp=&arnumber=8258452 (Year: 2017).*

\* cited by examiner

SECURE AUTHENTICATION SERVER FOR SMART CONTRACT

BACKGROUND OF THE INVENTION

Field of the Invention

The present invention relates to a secure authentication server for smart contracts. More particularly, the present invention relates to a server performing secure authentication by determining whether there exists vulnerability to the threat such as a hacking attack to an app or web which performs a smart contract and issuing a certificate to a smart contract source code free from the vulnerability.

Related Art

Smart contact refers to a method of the decentralized ledger technology, which is used to conclude a transaction automatically between parties if specific conditions for the transaction are satisfied. When transaction conditions and content are registered in a smart contract system, relevant laws and procedures corresponding to the contract are applied automatically, and a result of the contract is notified to the transaction parties. The smart contract provides an advantage that transaction procedures are simplified, and costs associated with contracting are reduced.

Meanwhile, smart contract may be prone to bugs due to errors in the 'source code' written in a programming language. According to a recent paper investigating bugs of Ethereum smart contracts, there are three types of bugs in smart contracts: bugs locking up money, bugs causing leakage of money, and bugs causing cancellation of a contract. In fact, among approximately one million smart contracts, 35,200 cases have been found to have potential security vulnerability, and 2365 cases have been found to definitely have bugs. In fact, there was an occasion where Parity, an Ethereum wallet, has been locked up due to a bug, which has locked up a fund of about 150 million USDs. As described above, a security problem in the smart contract may cause serious loss of money, and countermeasures against the problem is required; however, much effort still has to be done to authenticate security for smart contracts.

SUMMARY OF THE INVENTION

The present invention has been made to solve the problem above and is intended to analyze security vulnerability in smart contracts, establish specific security criteria, and verify security according to the criteria.

Also, the present invention is intended to construct a reliable smart contract environment by issuing a certificate to a smart contract the security stability of which passes the criteria.

A server which performs secure authentication on a source code for smart contract may comprise a communication unit receiving a smart contract source code from the server requesting secure authentication; and a controller checking security vulnerability based on the received smart contract source code, wherein the controller comprises a source code vulnerability checking unit reading a source code of a smart contract and checking vulnerability in the source code; a communication interval checking unit checking a communication interval for execution of the source code; an execution vulnerability checking unit checking app and web vulnerability on a browser in which the source code is executed; and in response to determining the security level satisfied with the required criterion as a result of checking by the source code vulnerability checking unit, communication interval checking unit, and execution vulnerability checking unit, a certificate issuing unit issuing a certificate and storing the certificate together with the source code in a blockchain block where the source code of the smart contract is stored.

Since various embodiments of the present invention assess security vulnerability of smart contract performed through blockchain and issue a certificate only for the smart contract which does not reveal security vulnerability, a contract program may be developed according to a stricter security criterion when a source code of the smart contract is designed.

Also, various embodiments of the present invention perform a smart contract only when a certificate is validated, thereby providing a smart transaction environment secure from hacking threats.

DESCRIPTION OF EXEMPLARY EMBODIMENTS

Figure 1:
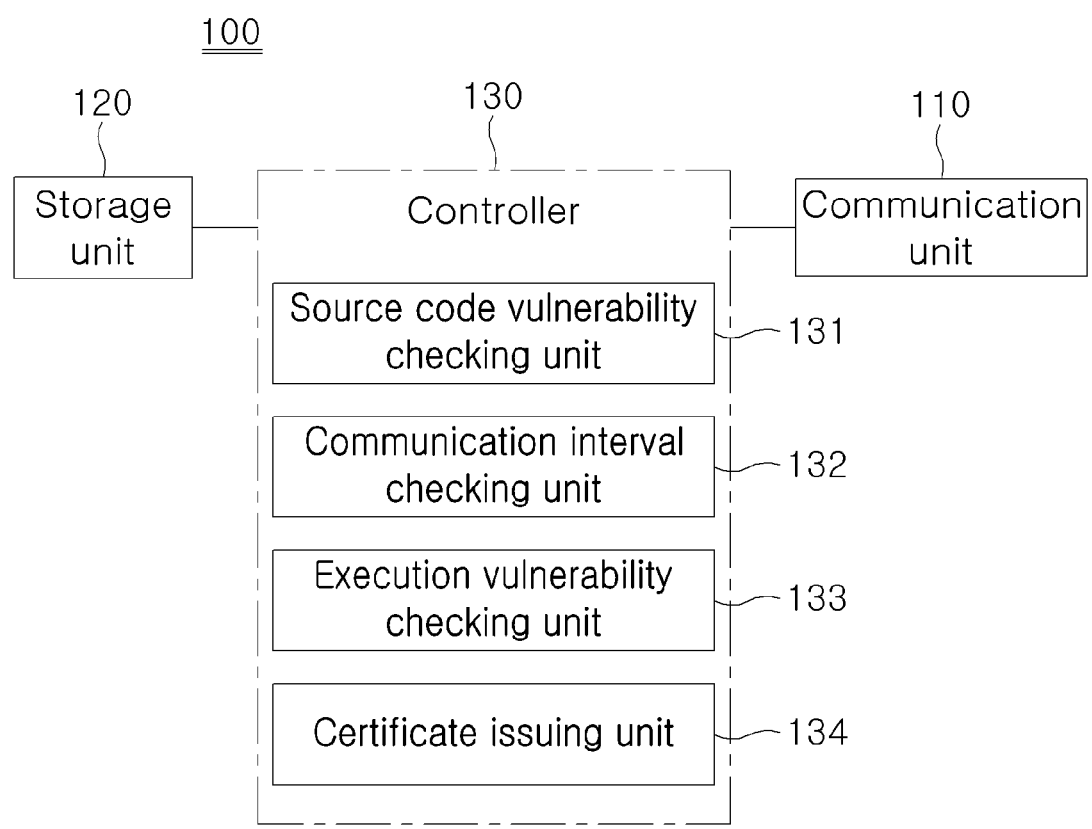
FIG. 1 is a block diagram illustrating a structure of a secure authentication server for smart contracts according to an embodiment of the present invention.

A server which performs secure authentication on a source code for a smart contract may comprise a communication unit receiving a smart contract source code from the server requesting secure authentication; and a controller checking security vulnerability based on the received smart contract source code, wherein the controller comprises a source code vulnerability checking unit reading a source code of a smart contract and checking vulnerability in the source code; a communication interval checking unit checking a communication interval for execution of the source code; an execution vulnerability checking unit checking app and web vulnerability on a browser in which the source code is executed; and in response to determining the security level satisfied with the required condition as a result of checking by the source code vulnerability checking unit, communication interval checking unit, and execution vulnerability checking unit, a certificate issuing unit issuing a certificate and storing the certificate together with the source code in a blockchain block where the source code of the smart contract is stored.

Since the present invention may be modified in various ways and may provide various embodiments, specific embodiments will be depicted in the appended drawings and described in detail with reference to the drawings.

However, it should be understood that the specific embodiments are not intended to restrict the gist of the present invention to the specific embodiments; rather, it should be understood that the specific embodiments include all of the modifications, equivalents or substitutes described by the technical principles and belonging to the technical scope of the present invention. To describe the respective drawings, similar reference symbol numbers are given to similar elements.

If a constituting element is said to be 'connected' or 'attached' to other constituting element, the former may be connected or attached directly to the other constituting element, but there may be a case in which another constituting element is present between the two constituting elements. On the other hand, if a constituting element is said to be 'directly connected' or 'directly attached' to other constituting element, it should be understood that there is no other constituting element between the two constituting elements.

Terms used in this document are intended only for describing a specific embodiment and are not intended to limit the technical scope of the present invention. A singular expression should be understood to indicate a plural expression unless otherwise explicitly stated. The term of 'include' or 'have' is used to indicate existence of an embodied feature, number, step, operation, element, component, or a combination thereof; and should not be understood to preclude the existence or possibility of adding one or more other features, numbers, steps, operations, elements, components, or a combination thereof.

In what follows, with reference to FIGS. 1 to 2b, a secure authentication operation for a smart contract according to an embodiment of the present invention will be described.

FIG. 1 is a block diagram illustrating a structure of a secure authentication server for smart contracts according to an embodiment of the present invention.

Figure 2A:
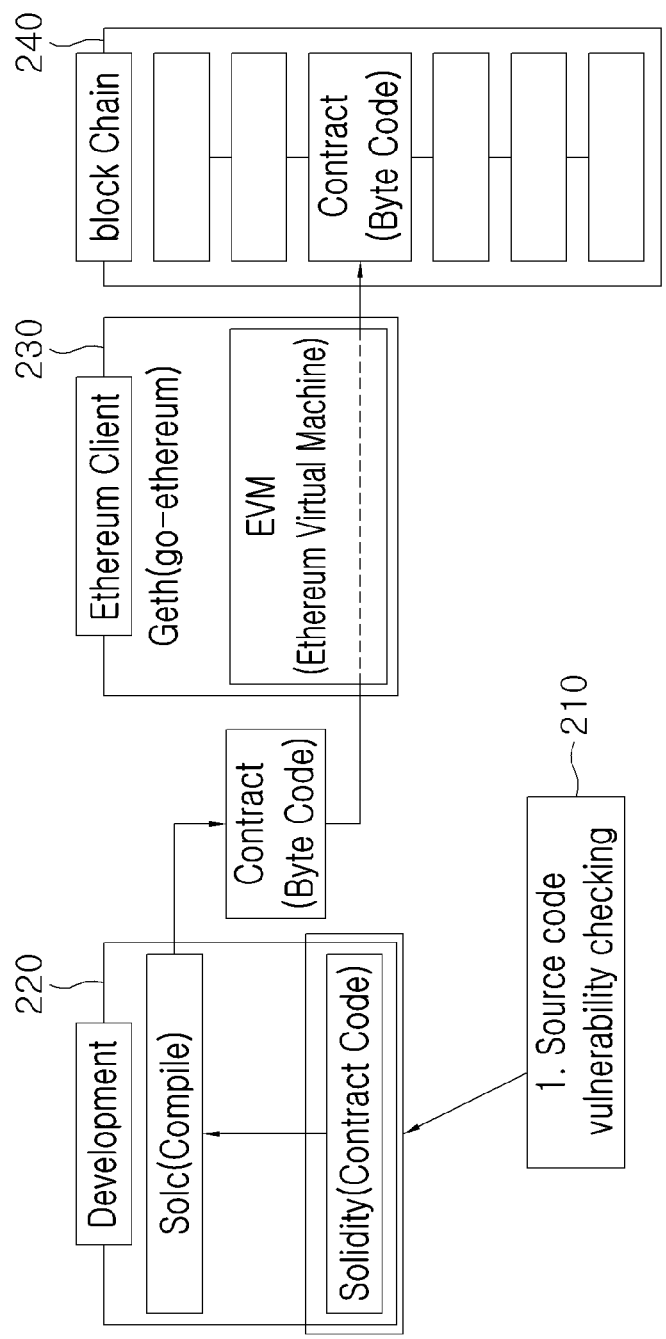
FIGS. 2a and 2b illustrate an example of an authentication operation of a secure authentication server for smart contracts according to an embodiment of the present invention.
Figure 2B:
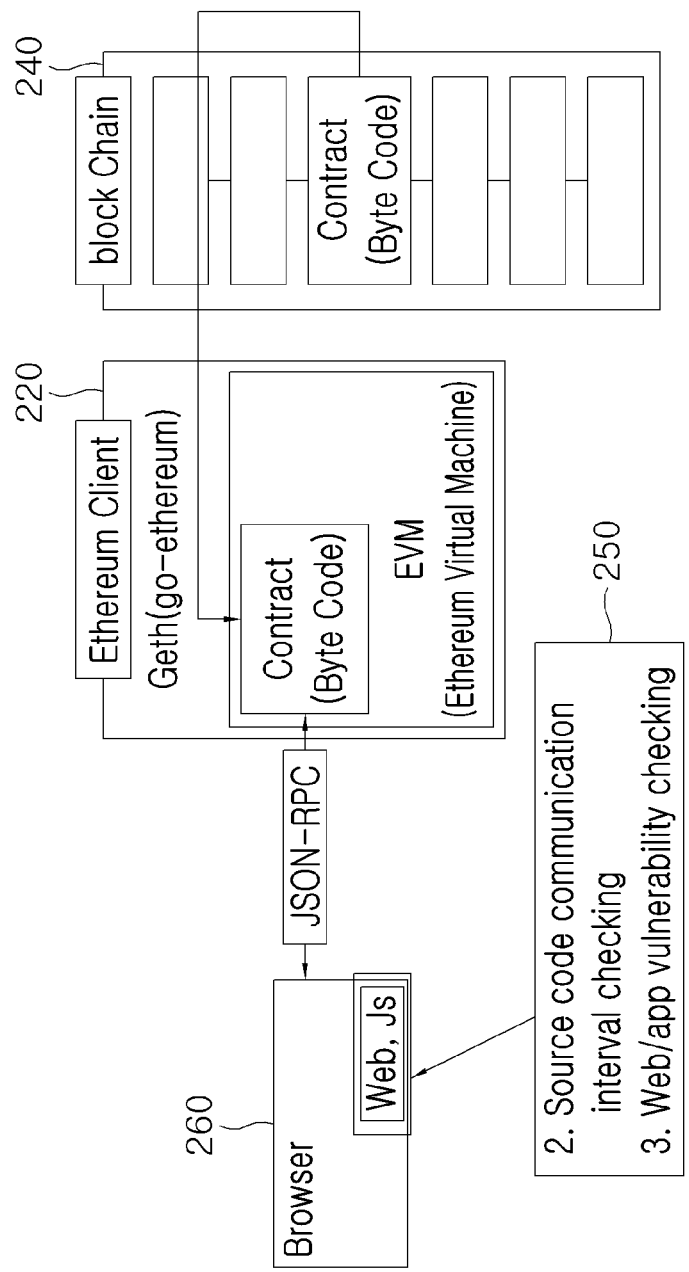

FIGS. 2a and 2b illustrate an example of an authentication operation of a secure authentication server for smart contracts according to an embodiment of the present invention.

The secure authentication server 100 according to an embodiment of the present invention may include a communication unit 110, storage unit 120, and controller 130. The controller 130 may include a source code vulnerability checking unit 131, communication interval checking unit 132, execution vulnerability checking unit 133, and certificate issuing unit 134.

The communication unit 110 may utilize a network for transmitting and receiving data between a user device and a server, where the type of the network is not limited to a particular one. For example, the network may be an Internet Protocol (IP) network which provides a service of transmitting and receiving a large amount of data or an All IP network which integrates different IP networks. Also, the network may be one of a wired network, Wireless Broadband (Wibro) network, mobile communication network including WCDMA, mobile communication network including a High Speed Downlink Packet Access (HSDPA) network and Long Term Evolution (LTE) network, mobile communication network including LTE advanced (LTE-A) and Five Generation (5G) network, satellite network, and Wi-Fi network; or a combination of at least one or more of the networks above.

The communication network 110 according to an embodiment of the present invention may receive a smart contract source code from a server requesting secure authentication. Also, the communication network 110 may perform a data transmission operation for storing a certificate on the blockchain in which the smart contract source code is stored, the certificate indicating completion of secure authentication of the corresponding source code. At this time, the blockchain may refer to a blockchain (for example, Ethereum) which supports smart contracts. And according to various embodiments, the blockchain may include a private blockchain managed by a government organization or corporate company as well as a public blockchain such as Ethereum.

Also, the communication unit 110 may collect information about a target company of secure authentication and clients according to various embodiments of the present invention. Referring to the collected data, the server 100 may analyze vulnerability of the web and apps in which a smart contract source code is implemented. For example, the server 100 may collect information about major hacking methods for each field, collect information about classification of a company providing a smart contract which is a target of security checking, calculates a hacking technique used primarily for classification of a company providing the smart contract which is a target of security checking, and writes a list of simulated hacking requests based on the calculated hacking technique. An operator of the server 100 may directly participate in part of the security checking process and manually perform simulated hacking, where the operator may perform simulated hacking based on the list of simulated hacking requests. And the server 100 may control a certificate to be issued only when the smart contract passes hacking techniques on the list of simulated hacking requests.

The communication unit 110 may receive not only a smart contract source code but also a certificate stored previously on the block body of a blockchain. Accordingly, the server 100 may determine validity of the corresponding certificate based on the code information and hash value of the received certificate; and only when the certificate is determined to be valid, the server 100 may approve smart contract operations.

The storage unit 120, for example, may include an internal or external memory. For example, an internal memory may include at least one of a volatile memory (for example, dynamic RAM (DRAM), static RAM (SRAM), or synchronous dynamic RAM (SDRAM)), non-volatile memory (for example, one-time programmable ROM (OTPROM), programmable ROM (PROM), erasable and programmable ROM (EPROM), electrically erasable and programmable ROM (EEPROM), mask ROM, flash ROM, flash memory (for example, NAND flash or NOR flash memory), hard drive, or solid state drive (SDD).

An external memory may further include a flash drive, for example, compact flash (CF), secure digital (SD), micro secure digital (Micro-SD), mini secure digital (Mini SD), extreme digital (xD), multi-media card (MMC), or memory stick. An external memory may be connected functionally and/or physically to an electronic device through various interfaces.

The storage unit 120 according to an embodiment of the present invention may store information about an automation tool for detecting vulnerability within the source code itself and vulnerability in a communication interval. Also, the storage unit 120 may store information about the minimum criterion required for issuing a certificate. For example, the storage unit 120 may further include information about a method for scoring each vulnerability item. And if a vulnerability discovery score exceeds the minimum criterion, the server 100 may stop the operation of issuing a certificate.

According to various embodiments, the storage unit 120 may store a classification criterion for each company requesting vulnerability analysis of a smart contract. Also, the storage unit 120 may store information about major attack methods for each company classification, history of past hacking occurrences, and information of hacking techniques. Also, the storage unit 120 may store a hash function for calculating a hash value to be included in a certificate at the time of issuing the certificate. At this time, the hash function may include, for example, MD4 function, SHA-0 function, SHA-1 function, SHA-256 function, SHA-384 function, and SHA-512 function, which is not limited to the hash functions mentioned above.

Also, the storage unit 120 may store a vulnerability list to be checked. The vulnerability lists are shown in the following tables.

TABLE 1

| Vulnerability name | Severity level | Description |
| --- | --- | --- |
| Weak Credentials | High | Vulnerability that may be exploited when a predictable password is used |
| Use Equals To Compare Strings | Medium | Vulnerability that may be exploited when a comparison operator such as == or != is used for comparison of strings |
| Method Argument Could Be Final | Medium | Vulnerability that may be exploited when reassignment is not defined after a transfer argument is passed (after an argument is passed, the corresponding argument needs to be reassigned, or final declaration is required) |
| Use of non-cryptographic PRNG | Medium | Vulnerability that may be exploited when a non-cryptographic pseudo-random number generator is used |
| Duplicate If | Low | Vulnerability that may be exploited when duplicate expressions are used |
| Weak Random | Low | Vulnerability that may be exploited when a weak random number generator is used |
| Constant Memory Allocation | Low | Vulnerability that may be exploited when a memory allocation function does not return the size of a data type (result of size of operator) (which may cause buffer overflow vulnerability) |
| Unused Function | Low | Vulnerability that may be exploited when a declared function is not used |
| Possible Off By One Error in For Loop | High | Vulnerability due to possibility of an infinite loop when the size of an array is not specified |
| Null Pointer | High | Vulnerability due to absence of a routine for checking the null value |
| Memleak | High | Vulnerability due to memory leak |
| Resource Leak | High | Vulnerability due to resource leak |
| Denial of Service | Low | Vulnerability to DoS attack due to the use of BufferedReader.readLine( ) function |
| Unused Allocated Memory | Low | Vulnerability that may be exploited when unused memory is allocated |
| Unread Variable | Low | Vulnerability that may be exploited when an unread value is allocated to a variable |

TABLE 2

| Vulnerability name | Severity level | Description |
| --- | --- | --- |
| Weak Credentials | High | Vulnerability that may be exploited when a predictable password is used |
| Use Equals To Compare Strings | Medium | Vulnerability that may be exploited when a comparison operator such as == or != is used for comparison of strings |
| Method Argument Could Be Final | Medium | Vulnerability that may be exploited when reassignment is not defined after a transfer argument is passed (after an argument is passed, the corresponding argument needs to be reassigned, or final declaration is required) |
| Use of non-cryptographic PRNG | Medium | Vulnerability that may be exploited when a non-cryptographic pseudo-random number generator is used |
| Duplicate If | Low | Vulnerability that may be exploited when duplicate expressions are used |
| Weak Random | Low | Vulnerability that may be exploited when a weak randomnumber generator is used |
| Constant Memory Allocation | Low | Vulnerability that may be exploited when a memory allocation function does not return the size of a data type (result of size of operator) (which may cause buffer overflow vulnerability) |
| Unused Function | Low | Vulnerability that may be exploited when a declared function is not used |
| External Links | Low | Vulnerability that may be exploited when an URL is included in a source code (an inappropriate link has to be reviewed) |
| Cross Site Scripting | High | Vulnerability that may be exploited when data received from a user is not filtered in a webpage but is retransmitted to the user by being included in a dynamically created webpage |
| SQL injection | High | Vulnerability due to reading or manipulating information of DB by injecting SQL statements to the input form or URL input field |
| Debug Parameter | High | Vulnerability due to existence of a debug-related parameter within a source code |
| Cryptography | High | Vulnerability due to existence of hard-coded cryptographic key within a source code |
| No Html Comments | High | Vulnerability due to existence of unnecessary URLs within HTML comments |
| Jsp Encoding | Medium | Vulnerability due to absence of encoding type |
| Potentially Sensitive Data Visible | Medium | Vulnerability due to existence of a temporary file |
| Process Control | Low | Vulnerability due to existence of an external program execution command (linux, cmd, and the like) within a source code |
| Poor Logging Practice | Low | Vulnerability that may be exploited when logs are output by using a function such as System.out.print (In) or System.err.print(In) (where the logging function may be used through an application) |

TABLE 2-continued

| Vulnerability name | Severity level | Description |
| --- | --- | --- |
| Buffer overflow | High | Vulnerability causing a defect by putting more data than the block size of a memory or a buffer |
| Format string | High | Vulnerability due to the problem that a string-processing part may access the memory space |
| Injection | High | Vulnerability allowing access to a database by injecting an input that may be interpreted as an SQL statement |
| Operating system command execution | High | Vulnerability that may allow attackers to call an operating system command and to attempt to install a backdoor or take over administrator rights when filtering of user input values is not conducted properly |
| Directory indexing | Medium | Vulnerability that displays the whole list of files within a directory and exposes important files such as a web server structure, backup files, or source files when directory indexing is enabled but an index file does not exist in the directory when the corresponding directory is requested |
| Excessive exposure of error page | Medium | Vulnerability that exposes important information when the attacker causes an error while error handling (e.g., redirecting to a separate error page) is not defined at the occurrence of the error |
| Plain text exposure of sensitive information | High | Vulnerability that exposes important information such as account information (ID and password) and personal information (resident registration number or card number) as plain text within a source of a web application |
| Security misconfiguration | High | Vulnerability allowing attackers to access a web server for which security is not configured properly |
| Plain text transmission of sensitive information | Medium | Vulnerability allowing information to be captured and stolen through eavesdropping when sensitive information such as login authentication information is transmitted as plain text without using an encryption method |
| Malicious content | High | Vulnerability having a malicious influence on the user as malicious content is injected to a web application instead of normal content |
| Cross-site scripting (XSS) | Medium | Vulnerability that may be exploited when filtering of user input values is not conducted properly in a web application, allowing attackers to insert a malicious script into an enterable form and thereby to steal a user session and distribute a malicious code. |
| Password complexity | High | Vulnerability that may be exploited when a weak password is allowed for membership subscription, allowing attackers to attempt password entering by guessing and password entering by using a dictionary file constructed by collecting surrounding information |
| Argument modification | High | Vulnerability that may be exploited when access control is not fully examined for all possible execution paths or performed insufficiently, allowing attackers to leak user information through an accessible execution path or to elevate administrative rights temporarily |
| Client-based authentication | High | Vulnerability that may be exploited when authentication is client-based, allowing attackers to bypass authentication through modification of the code such as javascript, VBscript, or JavaApplet. |
| Insufficient user authentication | Medium | Vulnerability that may be exploited when user authentication is insufficient (for example, authentication is performed based on user ID) in a personal information update page or single sign-on (SSO) session, allowing attackers to modify the value passed to a parameter and thereby to assume the user identity and leak personal information |
| Weak password recovery | High | Vulnerability that may be exploited if user authentication is insufficient or password is displayed right on the screen when a function for recovering a password stored in a web application or a temporary password is issued by an administrator, allowing attackers to obtain, modify, or recover the password of other user |
| Session prediction | High | Vulnerability that may be exploited by attackers to intercept a specific session by predicting the weak ID of the session such as one using a simple increasing ID |
| Insufficient access control | High | Vulnerability that does not limit access rights to sensitive data or functions |
| Insufficient session completion | Medium | Vulnerability that may be exploited when the same session ID is issued for each authentication or session timeout is set too long, thereby allowing attackers to reuse the session |
| Session fixation | High | Vulnerability allowing user authentication information to be reused by or retransmitted to other terminal |
| Automation attack | High | Vulnerability that may be exploited when the number of attempts to access a specific process is not limited, allowing attackers to perform the specific process repeatedly by using an automation tool and bot and thereby to initiate a large number of processes, eventually exerting an influence on the system performance |
| Process verification missing | High | Vulnerability allowing attackers to upload a web program capable of directly accessing a web server and executing system commands by using a file upload function |
| File upload | High | Vulnerability allowing attackers to upload a web program capable of directly accessing a web server and executing system commands by using a file upload function |

TABLE 2-continued

| Vulnerability name | Severity level | Description |
| --- | --- | --- |
| File download | High | Vulnerability allowing attackers to download attached key files by manipulating a file download path |
| Administrator page exposure | Medium | Vulnerability that may be exploited when the administrator page is composed in a predictable form, allowing attackers to easily access the administrator page and to obtain administrator rights through brute-force attack |
| Elevation of rights through modification of cookie values | High | Vulnerability allowing attackers to modify the cookie value, which is one of user authentication methods, and thereby to switch to a different user or elevate administrative rights |
| Unnecessary file exposure | Medium | Vulnerability that may be exploitedwhen a predictable directory or file name is used and the corresponding location thereof is easily exposed, allowing attackers to exploit the exposed location to access information about a target object and data containing sensitive information |
| Use of predictable password | High | Vulnerability that may be exploited when a default account and password are used after a web service is installed, allowing attackers to use the web service by exploiting the corresponding right |
| Exposure of system operation information by an external site | High | Vulnerability allowing important information of a web service and content of the web page to be collected through a search engine and thereby to be exposed to an external unauthorized person |
| Phishing attack using a redirect function | High | Vulnerability that may be exploitedwhen a redirect function exists, allowing a current page to be redirected to an arbitrary page due to lack of verification of URL arguments |
| Allowing unnecessary web method | Low | Vulnerability that may be exploited when unnecessary methods are allowed in addition to one commonly used in a web application, such as GET or POST method, allowing attackers to generate, delete, or modify a file in a web server by using the unnecessary method |

Table 1 above shows a list of vulnerabilities that may be checked on a smart contract source code, and Table 2 above shows a list of vulnerabilities that may be checked on a web/app. In other words, Table 1 may include a list of vulnerabilities checked by the source code vulnerability checking unit 131 described later, and Table 2 may include a list of vulnerabilities checked by the communication interval checking unit and execution vulnerability checking unit 133. The controller 130 may also be called a processor, controller, microcontroller, microprocessor, or microcomputer. Meanwhile, the controller may be implemented by hardware, firmware, software, or a combination thereof.

In the case of implementation by firmware or software, one embodiment of the present invention may be implemented in the form of modules, procedures, functions, and the like which perform the functions or operations described above. Software codes may be stored in the memory and activated by the controller. The memory may be located inside or outside of the user terminal and server and may exchange data with the controller by using various well-known means.

The controller 130 according to an embodiment of the present invention may comprise a source code vulnerability checking unit 131, communication interval checking unit 132, execution vulnerability checking unit 133, and certificate issuing unit 134.

Operation of the source code vulnerability checking unit 131 will be described with reference to FIG. 2a. FIG. 2a illustrates an operation of checking source code vulnerabilities performed by the source code vulnerability checking unit 131 on the smart contract source code stored on the blockchain 240 in the form of transactions.

As shown in FIG. 2a, in the Development step 220, the contract code written in Solidity may be converted to byte codes by compiling the contract code by Solc. The smart contract information converted to byte codes may be stored on the block body of the blockchain. The source code vulnerability checking unit 131 may perform vulnerability checking on a source code written in Solidity before the content of a smart contract is converted to byte codes. Here, Solidity is a java-based language for implementing smart contracts, and according to various embodiments of the present invention, a source code to be analyzed may be implemented by a programming language in addition to java-based Solidity.

Depending on various embodiments, while performing source code vulnerability checking 210, the source code vulnerability checking unit 131 may perform an operation of recording detected vulnerability and providing the detected vulnerability as feedback to a provider which has provided the source code to be analyzed. Also, when the examined source code is similar to the source code previously checked for vulnerability by more than a prescribed percentage, the examined source code may be determined as a modified version of the same source code. The source code vulnerability checking unit 131 may determine through various other methods whether an examined source code is the source code previously checked for vulnerability, and if the examined source code is determined as the source code in which vulnerability has been found from the previous source code checking, a vulnerability determining criterion performed in the subsequent step (communication interval checking step and web/app vulnerability checking step) may be changed. For example, the source code vulnerability checking unit 131 may increase a required reference value for passing a simulated hacking attack or increase the number of simulated hacking techniques that have to be overcome with respect to a smart contract in which vulnerability has been detection and which thereby has a history of modification of the source code.

After the source code vulnerability checking unit 131 checks vulnerabilities of a source code, the communication interval checking unit 132 and the execution vulnerability checking unit 133 may perform checking operations. The checking operations will be described with reference to FIG. 2b.

As shown in FIG. 2b, the content of a smart contract in the form of byte codes recoded on the blockchain 240 may be implemented on a decentralized network such as the Ethereum client 230. The platform on a decentralized network in which a smart contract in the form of byte codes is implemented may be Ethereum Virtual Machine (EVM), where the EVM may be used for other virtual currencies (for example, quantum) or DApp that comply with the Ethereum and the standard code Ethereum Request for Comment (ERC) 20 of the Ethereum.

A smart contract in the form of byte codes may be executed on the EVM, which immediately provides the user with the corresponding content of the smart contract through the browser 260. The communication interval checking unit 132 and the execution vulnerability checking unit 133 may check vulnerabilities on the browser 260 at the step of providing an operation for implementing the smart contract.

'web3.ja' shown within the browser 260 may indicate an Ethereum javascript API which implements the JSON Remote Procedure Call (RPC) specification. In other words, while the EVM for implementing smart contracts is a back-end concept, web3.js is a front-end concept for implementing smart contracts; and the communication interval checking unit 130 and the execution vulnerability checking unit 133 may check vulnerabilities with respect to a smart contract app (or web) implemented through web3.js performing the role of the front end.

Referring to 250 of FIG. 2b, the source code communication interval checking operation may be performed by the communication interval checking unit 132 and may perform the role of assessing vulnerabilities in a communication interval. And the web/app vulnerability checking operation may be performed by the execution vulnerability checking unit 133, which may include a manual checking operation by the operator of the server 100. According to various embodiments, the execution vulnerability checking unit 133 may adopt a new checking reference value set according to a determination result by the source code vulnerability checking unit 131 about whether there exists an error correction history or a vulnerability detection history. For example, the source code vulnerability checking unit 131 may strengthen the execution vulnerability checking criterion as used in a simulated hacking attack for a source code of a smart contract with an error correction history or a vulnerability detection history. In response to the operation above, the execution vulnerability checking unit 133 may request the operator to perform vulnerability checking (for example, simulated hacking attack) of an app (or web) implemented by the corresponding smart contract source code according to the strengthened criterion.

For a smart contract for which vulnerability checking has been completed by the source code vulnerability checking unit 131, communication interval checking unit 132, and execution vulnerability checking unit 133; and which has satisfied the vulnerability checking criterion, the certificate issuing unit 134 may issue a certificate.

The certificate issuing unit 134 issues a certificate when it is determined from a checking result by the source code vulnerability checking unit, communication interval checking unit, and execution vulnerability checking unit that the security level satisfies a required criterion; and the certificate issuing unit 134 may control the issued certificate to be stored together with the source code in the blockchain block to which the source code of the smart contract is stored.

Also, the certificate issuing unit 134 issues a certificate by including code information and a hash value indicating the certificate, where the hash value may be calculated based on the certificate code information and content of the smart contract source code. The certificate code information may include, for example, information about an authentication subject, information about an authentication date, and information about an authentication validation criterion. The hash value may prevent a code indicating the certificate from being copied irrespective of the source code. Even if the certificate code is the same, the hash value may have a different value when the source code of a smart contract is different; therefore, if a different certificate copy is used, the hash value is not validated since the hash value included in the certificate is not the one issued for the corresponding source code.

In addition, according to various embodiments, the certificate issuing unit 134 may calculate a hash value after adding various elements for preventing a certificate from being copied.

The certificate issuing unit 134 may control a certificate issued through the communication unit 110 to be transmitted to the block body of the blockchain as transaction data and to be stored therein.

According to various embodiments, the certificate issuing unit 134 may issue a certificate including a validation criterion. For example, the certificate issuing unit 134 may issue a certificate by including information about a valid period since it is possible that an authentication criterion is changed from since the certificate is issued, and a new threatening element is added.

Also, according to various embodiments, the certificate issuing unit 134 may distinguish a certificate issued for a public blockchain database (which transmits a certificate as transaction data to the block body of the blockchain and stores the certificate therein) from a certificate issued for a private blockchain database. This distinction results from a structural difference between a public blockchain database and a private blockchain database, where the public blockchain may be characterized that everyone is given a read permission, anyone may generate transactions, and anyone who has participated in a network may verify and authorize transactions. Meanwhile, the public blockchain is further characterized that it is difficult to be modified. Since the content of a certificate recorded in the public blockchain may not be modified, the certificate for the public blockchain may be issued by including a validation criterion such as a validation period at the time the certificate is created instead of being modified at a later time to be revoked, and accordingly, a smart contract provider may have to re-issue the certificate periodically.

Meanwhile, a private blockchain adopts the advantage of reliability assurance inherent to blockchain while maintaining the conventional centralized method. A private blockchain allows each node to be privileged differently by a central entity, which indicates that centralized control is possible for the private blockchain. Accordingly, a certificate, even if it is stored in a private blockchain, may be modified and discarded at a later time. In other words, the certificate issuing unit 134 may issue a certificate so that it may be discarded and modified at a later time, where, for example, the certificate may be issued by including information about the number of validations. For example, when the number of validations is set to 100, the certificate issuing unit 134 may issue a certificate that is invalidated when certificate reading and authentication is performed 100 times. To this purpose, the certificate issuing unit 134 may modify the content of a certificate by newly transmitting a code which sets the initial value of a certificate to 100 and decreases the initial value by one each time authentication is completed and a transaction is performed. If the initial number of validations is counted down to zero according to the method above, the certificate may be regarded as being invalid.

According to various embodiments, when recording a certificate in a public blockchain, the certificate issuing unit 134 may issue the certificate by including therein a valid period of the certificate while, when a certificate is recorded in a private blockchain, the certificate issuing unit 134 may issue the certificate by including therein the number of validations of the certificate.

Also, if the certificate expiration date is reached, or the number of validations becomes smaller than a prescribed number, the certificate issuing unit 134 may provide a notification for renewal of the certificate.

Figure 3:
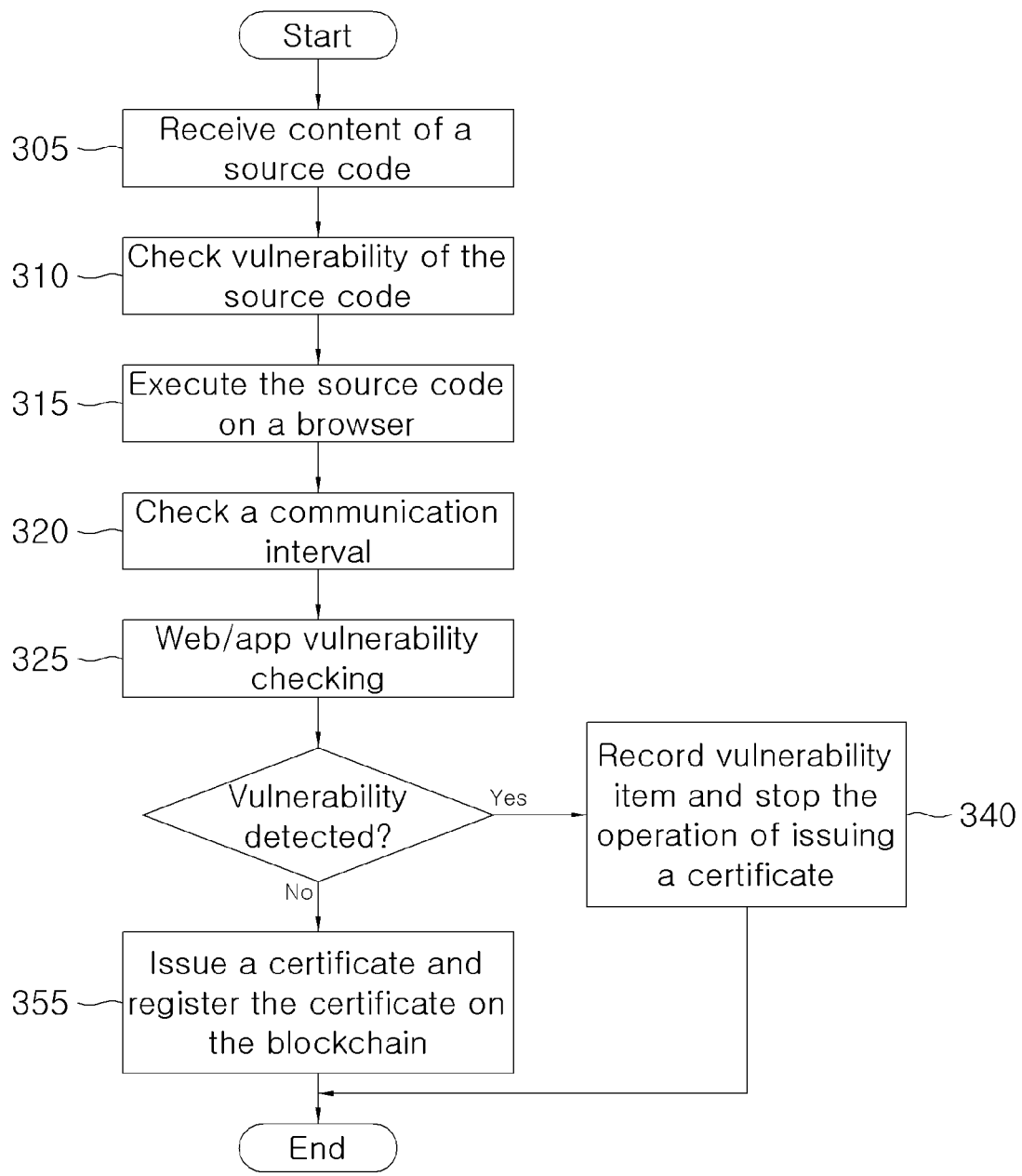
FIG. 3 is a flow diagram illustrating a procedure for issuing a security certificate of a smart contract according to an embodiment of the present invention.

FIG. 3 is a flow diagram illustrating a procedure for issuing a security certificate of a smart contract according to an embodiment of the present invention.

The server 100 (communication unit 110) may perform the operation of receiving the content of a source code 305. Afterwards, the controller 130 of the server 100 may perform the operation of checking vulnerability of the received source code 310. At this time, the controller 130 may determine whether vulnerability has been found in the source code, and the source has been modified. For a source code revealing vulnerability and having a history of modification, the controller 130 may request to increase the reference value used for checking vulnerability of a web/app to be performed subsequently.

After the operation of checking vulnerability of a source code 310, the controller 130 may perform the operation of executing the source code on a browser 315. Afterwards, the controller 130 may perform the operation of checking vulnerability in a communication interval of the source code 320. Afterwards, the controller 130 may perform the operation of checking vulnerability of an app and a web in which the corresponding source code has been implemented 325.

Afterwards, the controller 130 may perform the operation of determining whether vulnerability is found through vulnerability checking 330 and if vulnerability is found, may perform the operation of recording vulnerability type and stopping issuing of a certificate 340. The operation 340 may include the operation of recording the vulnerability type and providing the recorded vulnerability type to a source code provider as feedback information.

Meanwhile, if no vulnerability is found, the controller 130 may perform the operation of issuing a certificate and registering the issued certificate on the blockchain as transaction data 335.

According to various embodiments, the controller may determine whether vulnerability is found in the respective steps 310, 320, and 325; and perform the operation 340 if vulnerability is found in each step.

Also, if vulnerability is found by applying at least one of the operations 310 and 320, the controller 130 may increase the reference value of a vulnerability criterion for the operation 325; and accordingly, perform the vulnerability checking operation 325 according to the changed reference value.

And when the controller 130 issues a certificate, the certificate issuing unit 134 of the controller 130 is employed, where the certificate issuing unit 134 is characterized that it issues a certificate by including code information and a hash value therein and generates the hash value based on the certificate code information and the content of a smart contract source code. Also, when issuing a certificate by configuring a validation criterion, the certificate issuing unit 134 may include a preconfigured number of certifications and a preconfigured period in the validation criterion. Also, when a certificate is issued for a smart contract in which security vulnerability has been found and which thereby has a history of modifications, the certificate issuing unit 134 may configure a valid period for authentication to be shorter than a preconfigured default value and calculate a hash value of the certificate by including information about the shortened valid period. Also, when a certificate is recorded in a public blockchain, the certificate issuing unit 134 may issue the certificate by including a valid period of the certificate while, when a certificate is recorded in a private blockchain, the certificate may be issued by including therein the number of validations of the certificate.

Figure 4:
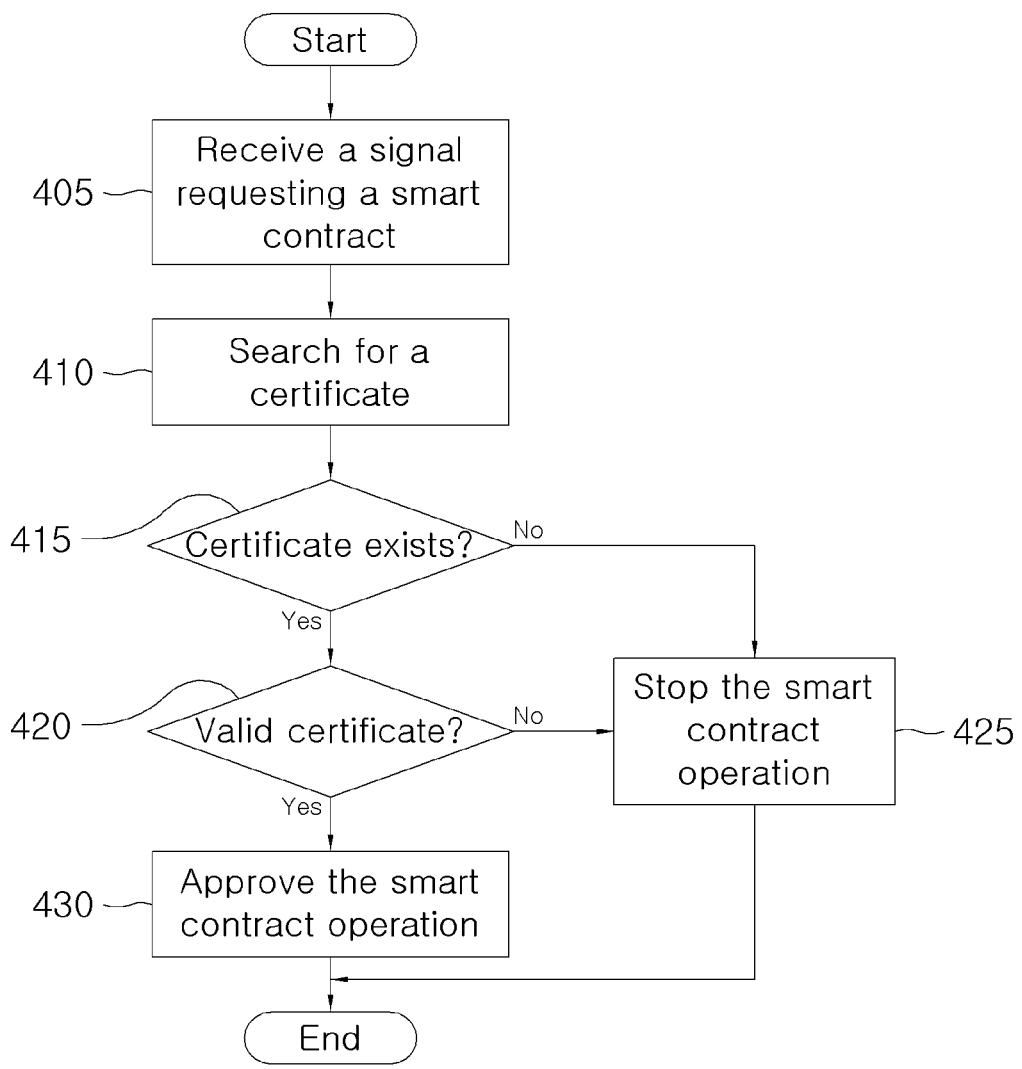
FIG. 4 is a flow diagram illustrating the order of operations for checking a certificate according to an embodiment of the present invention.

FIG. 4 is a flow diagram illustrating the order of operations for checking a certificate according to an embodiment of the present invention.

If performing the operation of receiving a smart contract request signal 405, the controller 130 may perform the operation of searching the transaction recording history of the corresponding block for a certificate corresponding to the smart contract 410. At this time, the controller 130 may search for the certificate by referring to the certificate storage location information for each smart contract stored previously in the server 100.

Afterwards, the controller 130 may perform the operation of determining whether a certificate exists 415 and if it is determined that the certificate does not exist, may perform the operation of requesting stopping the smart contract operation 425.

Meanwhile, if it is found that a certificate exists, the controller 130 may perform the operation of determining validity by reading the corresponding certificate 420. At this time, to determine validity of the certificate, the controller 130 may assess a validation criterion such as a valid period included in the certificate. Also, the controller 130 may determine whether the corresponding certificate has been forged by comparing the hash value included in the certificate.

Afterwards, if it is determined that the corresponding certificate is valid, the controller 130 may perform the operation of approving a smart contract operation 430. On the other hand, if it is determined that the corresponding certificate is invalid, the controller may request stopping the corresponding smart contract operation.

The present invention has been described in detail with reference to the embodiments above; however, it should be understood by those skilled in the art that alteration, modification, and variation of the present embodiments may be made without departing from the technical scope of the present invention. In other words, to achieve the intended effect of the present invention, all of the functional blocks shown in the drawings do not necessarily have to be included separately nor do all of the steps in the drawings necessarily have to be followed as they appear therein; even if not so operated, it should be noted that as much deviation as possible from the embodiments still belong to the technical scope of the present invention defined in the appended claims.

What is claimed is:

1. A server which performs secure authentication on a source code for smart contract, comprising:
    a communication unit receiving a smart contract source code from the server requesting secure authentication; and
    a controller checking security vulnerability based on the received smart contract source code, wherein the controller comprises:
- a source code vulnerability checking unit reading a source code of a smart contract and checking vulnerability in the source code;
- a communication interval checking unit checking a communication interval for execution of the source code;
- an execution vulnerability checking unit checking app and web vulnerability on a browser in which the source code is executed; and
- in response to determining a security level satisfied with a required criterion as a result of checking by the source code vulnerability checking unit, communication interval checking unit, and execution vulnerability checking unit, a certificate issuing unit issuing a certificate and storing the certificate together with the source code in a blockchain block where the source code of the smart contract is stored.

2. The server of claim 1, wherein the certificate issuing unit issues the certificate by including therein code information and a hash value; and
- generates the hash value based on certificate code information and content of a smart contract source code.

3. The server of claim 1, wherein, when the certificate issuing unit issues the certificate by configuring a validation criterion, the validation criterion includes a preconfigured number of certifications and a preconfigured period.

4. The server of claim 1, wherein the execution vulnerability checking unit performs vulnerability checking by increasing a required reference value for passing a simulated hacking attack with respect to a smart contract in which vulnerability has been detected by at least one of the source code vulnerability checking unit and the communication interval checking unit and which thereby has a history of modification of a source code.

5. The server of claim 1, wherein, when a certificate is issued for a smart contract in which security vulnerability has been found and which thereby has a history of modifications, the certificate issuing unit configures a valid period for authentication to be shorter than a preconfigured default value and calculates a hash value of the certificate by including information about the shortened valid period.

6. The server of claim 1, wherein the controller performs certificate checking to perform an operation of the smart contract, wherein existence of the certificate is determined based on transaction location information; in the presence of the certificate, determines validity of the certificate by receiving a code and hash value of the certificate; and if it is determined to be a valid certificate, approves to perform the corresponding smart contract operation.

7. The server of claim 1, wherein, if vulnerability is detected in a source code under analysis, the source code vulnerability checking unit stops subsequent operations for issuing a certificate and reports a list of detected vulnerabilities and modifications.

8. The server of claim 1, wherein, when recording a certificate in a public blockchain, the certificate issuing unit issues the certificate by including therein a valid period of the certificate while, when a certificate is recorded in a private blockchain, the certificate issuing unit issues the certificate by including therein a number of validations of the certificate.

* * * * *